United States Patent
Fan et al.

(10) Patent No.: US 12,182,977 B2
(45) Date of Patent: Dec. 31, 2024

(54) IMAGE PROCESSING METHOD AND IMAGE DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Qingwen Fan, Beijing (CN); Longhui Wang, Beijing (CN); Jinghua Miao, Beijing (CN); Shuai Hao, Beijing (CN); Huidong He, Beijing (CN); Shuo Zhang, Beijing (CN); Wenyu Li, Beijing (CN); Lili Chen, Beijing (CN); Hao Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 454 days.

(21) Appl. No.: 17/765,424

(22) PCT Filed: Apr. 12, 2021

(86) PCT No.: PCT/CN2021/086593
§ 371 (c)(1),
(2) Date: Mar. 30, 2022

(87) PCT Pub. No.: WO2021/227740
PCT Pub. Date: Nov. 18, 2021

(65) Prior Publication Data
US 2022/0351340 A1 Nov. 3, 2022

(30) Foreign Application Priority Data
May 9, 2020 (CN) .......................... 202010388616.6

(51) Int. Cl.
*G06T 5/80* (2024.01)

(52) U.S. Cl.
CPC ...... *G06T 5/80* (2024.01); *G06T 2207/20021* (2013.01)

(58) Field of Classification Search
CPC ...... G03F 7/70633; G03F 1/72; G03F 9/7003; G03F 9/7088; G06T 7/11; G06T 7/0004; G06T 2207/10; G06T 2207/20116
See application file for complete search history.

(56) References Cited

U.S. PATENT DOCUMENTS

| 7,596,286 B2 * | 9/2009 | Nose ................. G06T 3/047 |
| | | 382/300 |
| 11,595,574 B1 * | 2/2023 | Lu ...................... G06T 7/85 |

(Continued)

FOREIGN PATENT DOCUMENTS

| CN | 105869142 A | 8/2016 |
| CN | 108596854 A | 9/2018 |

(Continued)

*Primary Examiner* — Wesley J Tucker
(74) *Attorney, Agent, or Firm* — IP & T GROUP LLP

(57) ABSTRACT

An image processing method is applied to an image display device, the image display device includes a lens having distortion coefficients and a display screen. The image processing method includes: dividing a display region of the display screen into image regions according to the distortion coefficients of the lens, an outer boundary line of each image region enclosing a polygon, a geometric center of the polygon enclosed by the outer boundary line of the image region coinciding with a geometric center of the lens, and distortion coefficients of positions of the lens on which vertexes of the polygon enclosed by the outer boundary line of the image region are mapped being the same; and performing anti-distortion processing on coordinates of vertexes of the image region according to a distortion coeffi- (Continued)

A display region A of a display screen 102 is divided into a plurality of image regions S according to a plurality of distortion coefficients K of a lens 101; an outer boundary line L of each image region S encloses a polygon; a geometric center O2 of the polygon enclosed by the outer boundary line L of the image region S coincides with a geometric center O1 of the lens 101; and distortion coefficients of positions of the lens 101 on which vertexes of the polygon enclosed by the outer boundary line L of the image region S are mapped are the same — S10

Anti-distortion processing is performed on coordinates of vertexes of the image region S according to a distortion coefficient corresponding to the vertexes of the image region S, so as to obtain texture coordinates of the vertexes of the image region S — S20 cient corresponding to the vertexes of the image region to obtain texture coordinates of the vertexes of the image region.

18 Claims, 10 Drawing Sheets

(56) References Cited

U.S. PATENT DOCUMENTS

| | | | |
|---|---|---|---|
| 2005/0213159 | A1 | 9/2005 | Okada et al. |
| 2017/0206689 | A1* | 7/2017 | Eo .............................. G06T 3/18 |
| 2017/0230558 | A1* | 8/2017 | Morales ................. H04N 25/60 |
| 2019/0236805 | A1* | 8/2019 | Mou ....................... G06T 3/047 |
| 2021/0227190 | A1 | 7/2021 | Fan et al. |
| 2021/0358093 | A1 | 11/2021 | Chu et al. |
| 2022/0206571 | A1* | 6/2022 | Drozdov ................. G06V 40/19 |
| 2023/0056183 | A1* | 2/2023 | Lu ........................ H04N 17/002 |
| 2023/0394622 | A1* | 12/2023 | Lu ........................ G06V 40/168 |

FOREIGN PATENT DOCUMENTS

| | | | | |
|---|---|---|---|---|
| CN | 108648254 | A * | 10/2018 | ............. G06T 15/00 |
| CN | 109754380 | A | 5/2019 | |
| CN | 111539898 | A | 8/2020 | |

* cited by examiner

IMAGE PROCESSING METHOD AND IMAGE DISPLAY DEVICE

CROSS-REFERENCE TO RELATED APPLICATIONS

This application is a national phase entry under 35 USC 371 of International Patent Application No. PCT/CN2021/086593, filed on Apr. 12, 2021, which claims priority to Chinese Patent Application No. 202010388616.6, filed on May 9, 2020, which are incorporated herein by reference in their entirety.

TECHNICAL FIELD

The present disclosure relates to the field of display technologies, and in particular, to an image processing method and an image display device.

BACKGROUND

An image display device, e.g., adopts a virtual reality (VR) technology using a computer simulation system that can create and experience a virtual world, and uses a computer to generate a simulation environment into which a user is immersed.

The virtual reality technology mainly includes simulation environment, perception, natural skills and sensing equipment. The simulation environment is a real-time dynamic three-dimensional (3D) realistic image generated by a computer. The perception means that an ideal virtual reality technology should have the perception that people all have. In addition to visual perception generated by computer graphics technology, the perception also includes perceptions such as hearing, touch, force, motion, even including smell and taste, which is also referred to as multi-perception. Therefore, when performing a virtual reality technology display, the user can be immersed into an immersive environment provided by the virtual reality technology, which brings a relatively real use experience to the user.

SUMMARY

In an aspect, an image processing method is provided. The image processing method is applied to an image display device, the image display device includes a lens and a display screen, and the lens has a plurality of distortion coefficients. The image processing method includes: dividing a display region of the display screen into a plurality of image regions according to the plurality of distortion coefficients of the lens, an outer boundary line of each image region enclosing a polygon, a geometric center of the polygon enclosed by the outer boundary line of the image region coinciding with a geometric center of the lens, and distortion coefficients of positions of the lens on which vertexes of the polygon enclosed by the outer boundary line of the image region are mapped being the same; and performing anti-distortion processing on coordinates of vertexes of the image region according to a distortion coefficient corresponding to the vertexes of the image region, so as to obtain texture coordinates of the vertexes of the image region.

In some embodiments, in a direction from the geometric center of the lens to an edge of the lens, the plurality of distortion coefficients of the lens gradually increase. For two adjacent image regions, a number of vertexes of an image region that is relatively proximate to the geometric center of the lens is less than or equal to a number of vertexes of an image region that is relatively away from the geometric center of the lens.

In some embodiments, the lens includes a plurality of distortion portions, geometric centers of the plurality of distortion portions coincide with the geometric center of the lens, and each distortion portion has at least one distortion coefficient of the plurality of distortion coefficients. Outer boundary line(s) of at least one image region are mapped in a same distortion portion. In a direction from the geometric center of the lens to an edge of the lens, a number of vertexes of image regions mapped in the distortion portions sequentially increases.

In some embodiments, outer boundary lines of image regions are mapped in a same distortion portion, and a number of vertexes of each image region mapped in the same distortion portion is equal.

In some embodiments, distortion coefficients corresponding to vertexes of different image regions are not equal. A number of image regions into which the display region of the display screen is divided is equal to a number of the plurality of distortion coefficients of the lens.

In some embodiments, a number of the plurality of distortion coefficients of the lens is 10. In a direction from the geometric center of the lens to an edge of the lens, a number of vertexes of the plurality of image regions is 3, 6, 6, 12, 12, 12, 24, 24, 24 and 24, respectively; or a number of vertexes of the plurality of image regions is 3, 6, 6, 12, 12, 24, 24, 48, 48 and 48, respectively.

In some embodiments, the image processing method further includes: sorting coordinates of vertexes of the plurality of image regions according to a mapping mode, so as to obtain an index coordinate; connecting the vertexes of the plurality of image regions according to the index coordinate, so as to divide the plurality of image regions into a plurality of regions to be mapped, the plurality of regions to be mapped being not overlapped with one another; mapping portions of a target image sequentially in the plurality of regions to be mapped according to texture coordinates of the vertexes of the plurality of image regions and the index coordinate, so as to obtain a target image after anti-distortion processing; and displaying the target image after anti-distortion processing.

In some embodiments, the mapping mode is a triangle mapping mode. Connecting the vertexes of the plurality of image regions according to the index coordinate, so as to divide the plurality of image regions into the plurality of regions to be mapped, includes: connecting the vertexes of the plurality of image regions according to the index coordinate, so as to divide each image region into at least one triangle region.

Each remaining image region of remaining image regions other than an image region closet to the geometric center of the lens is divided into a plurality of triangle regions, the plurality of triangle regions are not overlapped with one another, and the plurality of triangle regions in the remaining image region have vertexes of the remaining image region; at least one vertex of vertexes of each triangle region in an image region is vertex(s) of an adjacent image region that is closer to the geometric center of the lens; areas of the plurality of triangle regions in each remaining image region are not completely equal; and in a direction from the geometric center of the lens to an edge of the lens, a number of triangle regions in image regions with different numbers of vertexes gradually increases, and areas of the triangle regions in the image regions with different numbers of vertexes gradually decrease.

In another aspect, an image display device is provided. The image display device includes a body, and a display screen, a lens and an image processor that are disposed on the body. The lens is closer to a human eye than the display screen when the image display device is worn, and the lens has a plurality of distortion coefficients.

The image processor is coupled to the display screen. The image processor is configured to: divide a display region of the display screen into a plurality of image regions according to the plurality of distortion coefficients of the lens, so that an outer boundary line of each image region encloses a polygon, a geometric center of the polygon enclosed by the outer boundary line of the image region coincides with a geometric center of the lens, and distortion coefficients of positions of the lens on which vertexes of the polygon enclosed by the outer boundary line of the image region are mapped are the same; and perform anti-distortion processing on coordinates of vertexes of the image region according to a distortion coefficient corresponding to the vertexes of the image region, so as to obtain texture coordinates of the vertexes of the image region.

In some embodiments, the image processor is further configured to: sort coordinates of vertexes of the plurality of image regions according to a mapping mode to obtain an index coordinate; connect the vertexes of the plurality of image regions according to the index coordinate, so as to divide the plurality of image regions into a plurality of regions to be mapped that are not overlapped with one another; and map portions of a target image sequentially in the plurality of regions to be mapped according to texture coordinates of the vertexes of the plurality of image regions and the index coordinate, so as to obtain a target image after anti-distortion processing.

In some embodiments, the mapping mode is a triangle mapping mode, and the image processor is configured to connect the vertexes of the plurality of image regions according to the index coordinate, so as to divide each image region into at least one triangle region. Each remaining image region of remaining image regions other than an image region closest to the geometric center of the lens is divided into a plurality of triangle regions, the plurality of triangle regions are not overlapped with one another, and the plurality of triangle regions in the remaining image region have vertexes of the remaining image region; at least one vertex of vertexes of each triangle region in an image region is vertex(s) of an adjacent image region that is closer to the geometric center of the lens; areas of the plurality of triangle regions in each remaining image region are not completely equal; and in a direction from the geometric center of the lens to an edge of the lens, a number of triangle regions in image regions with different numbers of vertexes gradually increases, and areas of the triangle regions in the image regions with different numbers of vertexes gradually decrease.

In some embodiments, the image display device further includes a controller disposed on the body. The controller is coupled to the image processor.

In yet another aspect, a non-transitory computer-readable storage medium is provided. The non-transitory computer-readable storage medium stores computer program instructions that, when run on a processor, cause the processor to perform one or more steps of the image processing method as described in any of the above embodiments.

In some embodiments, the mapping mode is a quadrilateral mapping mode. Connecting the vertexes of the plurality of image regions according to the index coordinate, so as to divide the plurality of image regions into the plurality of regions to be mapped, includes: connecting the vertexes of the plurality of image regions according to the index coordinate, so as to divide each image region into at least one quadrilateral region. Each remaining image region of remaining image regions other than an image region closest to the geometric center of the lens is divided into a plurality of quadrilateral regions, at least two vertexes of vertexes of each quadrilateral region in an image region are vertexes of an adjacent image region that is closer to the geometric center of the lens; areas of the plurality of quadrilateral regions in each remaining image region are not completely equal; and in a direction from the geometric center of the lens to an edge of the lens, a number of quadrilateral regions in image regions with different numbers of vertexes gradually increases, and areas of the quadrilateral regions in the image regions with different numbers of vertexes gradually decrease.

In some embodiments, the image processing method further includes: obtaining target image data and a vertical synchronization signal before the display region of the display screen is divided into the plurality of image regions; and obtaining a target image by rendering according to the target image data after the vertical synchronization signal is obtained.

In some embodiments, the image processing method further includes: updating target image data of a subsequent frame and the vertical synchronization signal after a target image of a first frame after anti-distortion processing is displayed.

In some embodiments, the image processing method further includes: mapping target images of subsequent frames sequentially according to texture coordinates of vertexes of the plurality of the image regions obtained after anti-distortion processing is performed on the target image of the first frame.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these accompanying drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
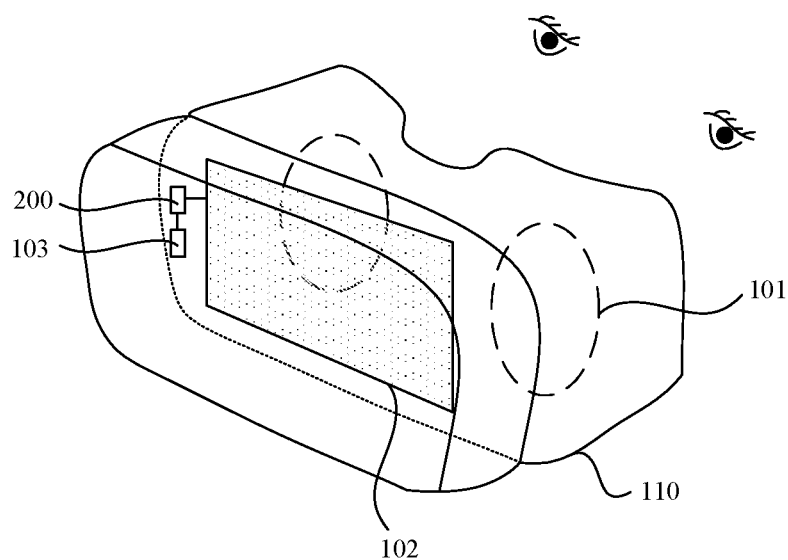
FIG. 1 is a structural diagram of an image display device, in accordance with some embodiments of the present disclosure.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "multiple", "a plurality of" or "the plurality of" means two or more unless otherwise specified.

In the description of some embodiments, terms such as "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The use of the phrase "applicable to" or "configured to" herein means an open and inclusive meaning, which does not exclude devices that are applicable to or configured to perform additional tasks or steps.

The term such as "about" or "approximately" as used herein includes a stated value and an average value within an acceptable range of deviation of a particular value. The acceptable range of deviation is determined by a person of ordinary skill in the art in view of the measurement in question and errors associated with the measurement of a particular quantity (i.e., limitations of the measurement system).

Some embodiments of the present disclosure provide an image display device 100, and as shown in FIG. 1, the image display device 100 includes a body 110, and a display screen 102 and a lens 101 that are disposed on the body 110.

It will be noted that the body 110 in the image display device 100 is a structure that achieves image display in the image display device 100, and the structure may be proximate to a human face.

For example, the image display device may be a virtual reality (VR) device. In a case where the image display device 100 is a head-mounted virtual reality device, the body 110 is a head-mounted display.

For example, the display screen 102 may be a liquid crystal display screen.

In a case where the image display device 100 is an image display device used in conjunction with a mobile phone, the display screen 102 may be a display screen of the mobile phone.

The lens 101 is closer to a human eye than the display screen 102 when the image display device 100 is worn.

It will be understood that a user may see a target image displayed on the display screen 102 through the lens 101 at a large field of view (FOV).

For example, the lens 101 is a convex lens.

Figure 2:
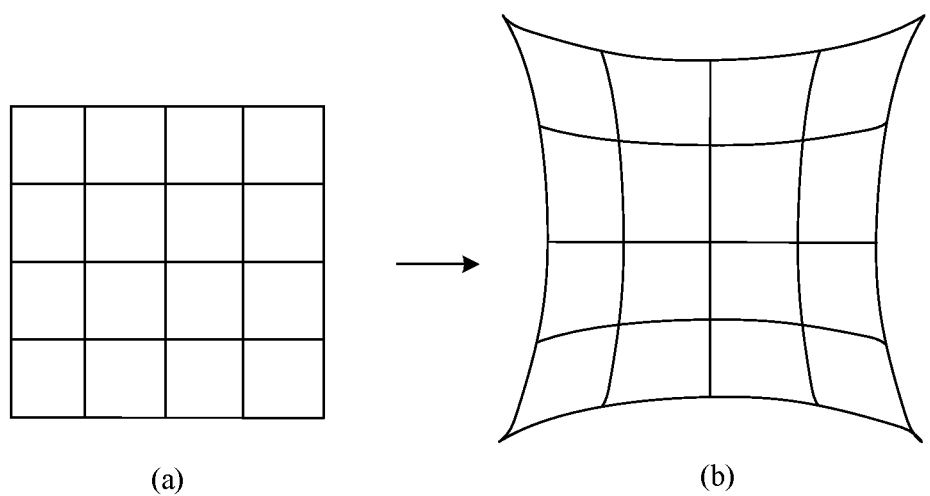
FIG. 2 is a diagram showing a comparison of a normal target image and a distorted target image of an image display device, in accordance with some embodiments of the present disclosure.

In this case, focal lengths of spherical positions of the lens 101 are different, so that an image viewed by the user through the lens 101 is distorted. The larger the field of view at which the user views the target image is, the larger the distortion of the target image viewed by the user is. Therefore, when the user views a normal target image (as shown in part (a) of FIG. 2), a portion of an actually viewed target image away from a geometric center point thereof looks to be stretched. In this way, the target image viewed by the user is similar to a virtual image presented after the target image is enlarged by the lens 101, so that the target image has a distortion effect (e.g., a pincushion distortion effect shown in part (b) of FIG. 2).

On this basis, anti-distortion processing may be performed on the target image. A display region of the display screen 102 is divided into a plurality of image regions. The anti-distortion processing is performed on vertexes of the image regions obtained according to the distortion coefficients of the lens 101, so as to obtain a target image after anti-distortion processing. Compared with performing anti-distortion processing on each pixel of the target image, the above method may reduce an amount of computation during image processing, and lower configuration requirements of device for performing the anti-distortion processing.

Figure 4:
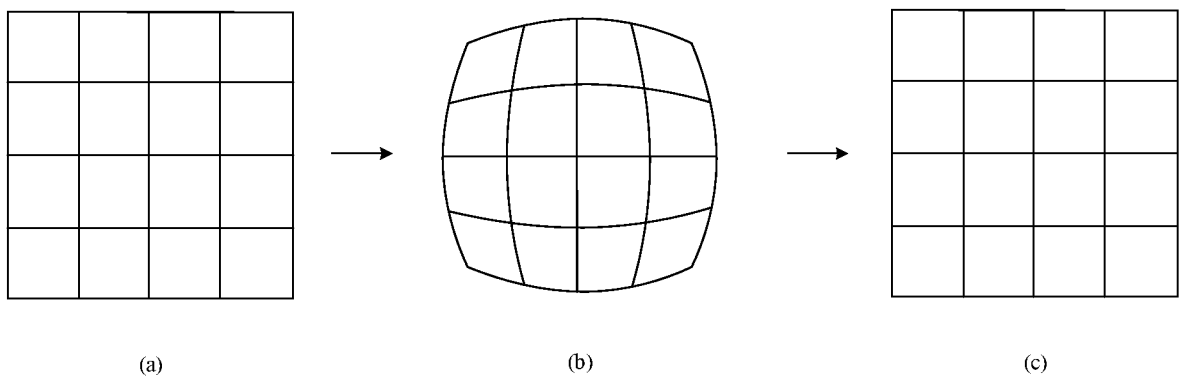
FIG. 4 is a diagram showing a comparison of a normal target image and a target image after anti-distortion processing of an image display device, in accordance with some embodiments of the present disclosure.

For example, the anti-distortion processing is performed on the normal target image shown in part (a) of FIG. 4 to obtain the target image (e.g., a target image having a barrel distortion effect) after anti-distortion processing shown in part (b) of FIG. 4. When the user views the target image after anti-distortion processing through the lens 101, due to action of the lens, the target image viewed by the user is the normal target image shown in part (c) of FIG. 4, thereby reducing a distortion degree of the target image.

A shape of the display screen 102 is generally rectangular. During performing anti-distortion processing, the display region of the display screen 102 is divided into the plurality of image regions according to the shape of the display screen 102, and the plurality of image regions (e.g., (24×24) image regions S' shown in FIG. 3) are distributed in a grid-like manner. However, a shape of the lens 101 (e.g., a circle) does not match the shape of the display screen 102, and thus distortion coefficients of positions of the lens 101 on which vertexes of the grid are mapped do not match distortion coefficients K of the lens 101. For example, the vertexes of the grid exist between boundaries of different distortion coefficients K of the lens 101, which results in that connections of images located between the boundaries of different distortion coefficients K of the lens 101 are not smooth during mapping according to texture coordinates of vertexes of the grid, thereby affecting the anti-distortion effect.

Figure 3:
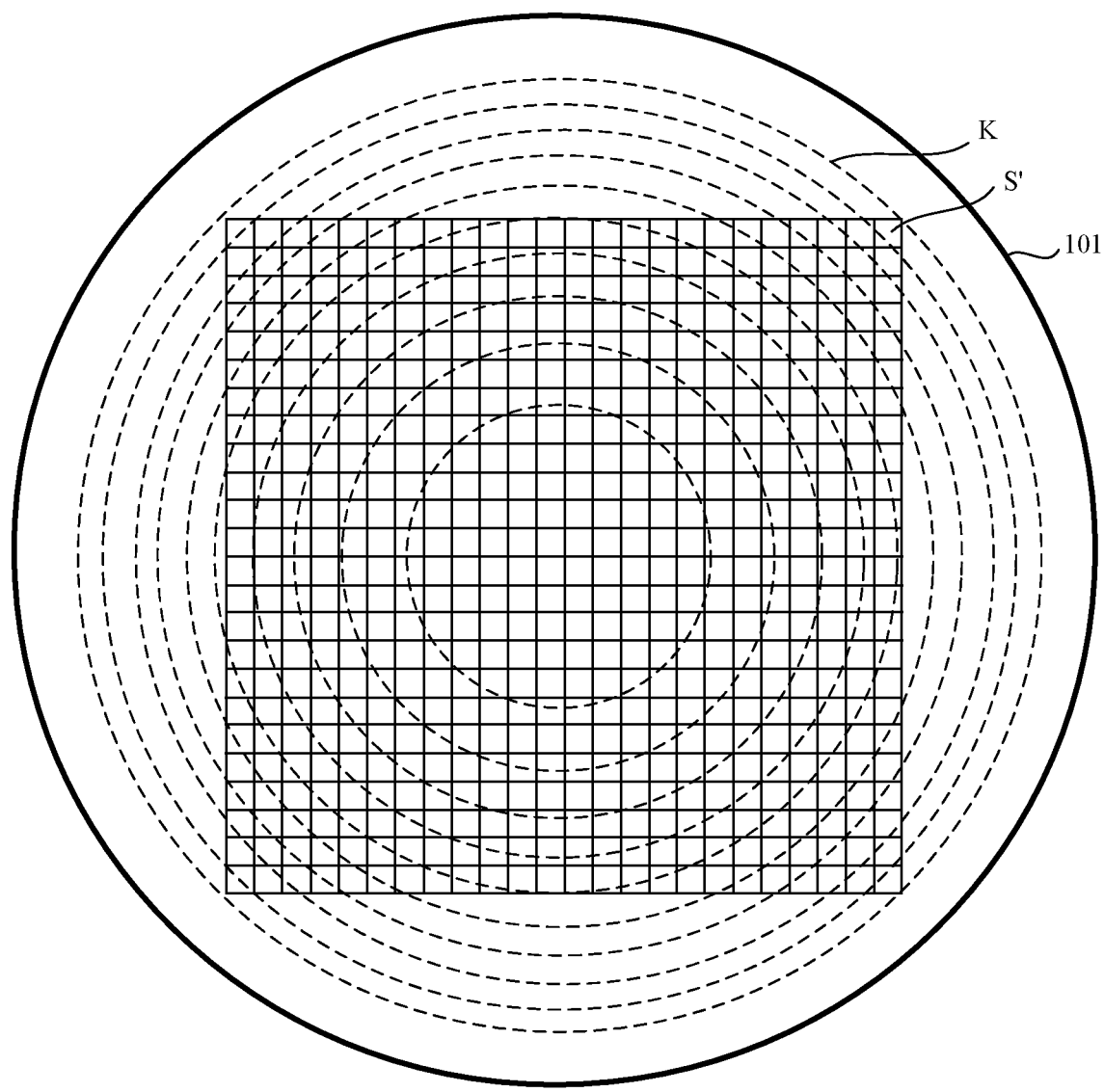
FIG. 3 is a diagram showing a distribution of a plurality of image regions in the related art.

In addition, the plurality of image regions are distributed in a grid-like manner, for example, (24×24) image regions S' distributed in a grid-like manner in FIG. 3 have (25×25) vertexes, the number of image regions S' is large, and the number of vertexes is large. In this case, an amount of computation of the anti-distortion processing is large, time for the anti-distortion processing is prolonged, and time for the mapping is prolonged, which causes a frame drop phenomenon during display.

Embodiments of the present disclosure provide an image processing method. The image processing method is applied to the image display device 100.

As shown in FIG. 1, the image display device 100 includes the lens 101 and the display screen 102.

Figure 5:
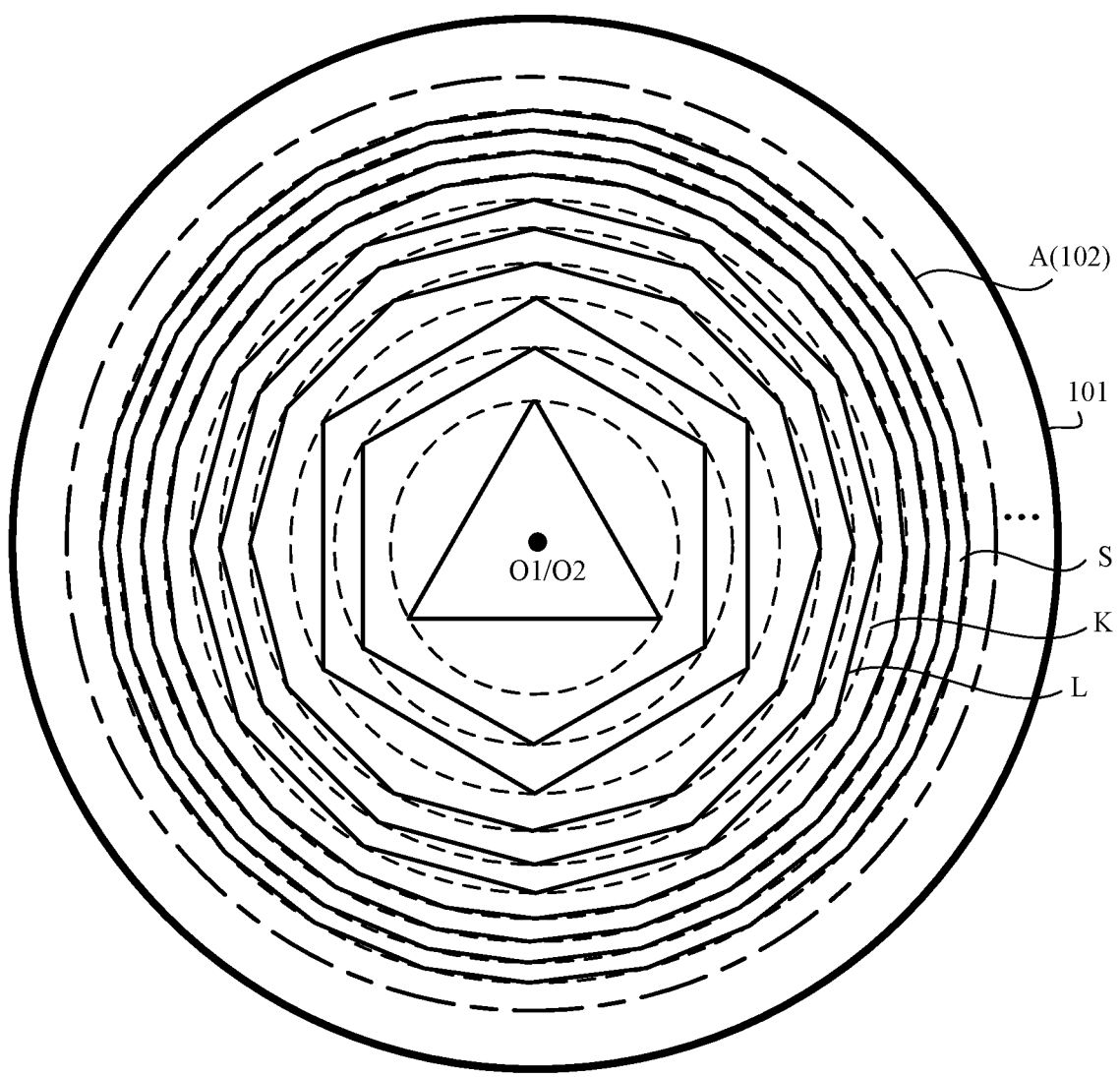
FIG. 5 is a diagram showing a distribution of a plurality of image regions, in accordance with some embodiments of the present disclosure.

As shown in FIG. 5, the lens 101 has a plurality of distortion coefficients K.

Figure 6:
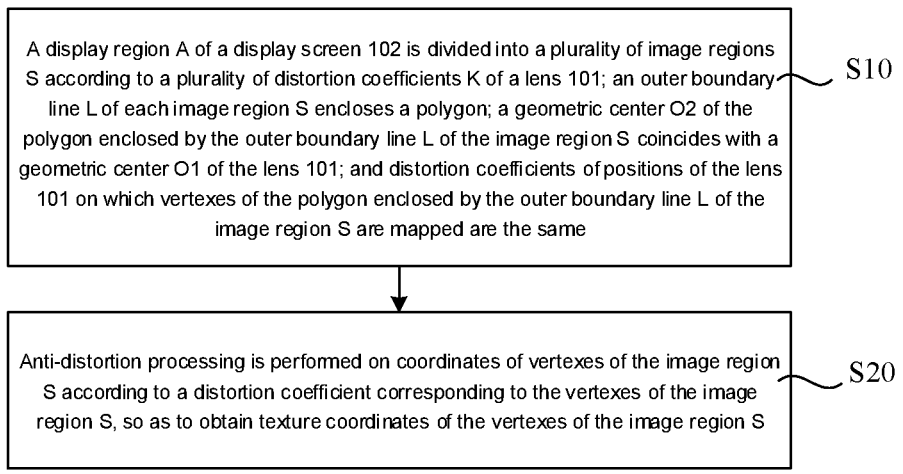
FIG. 6 is a flow diagram of an image processing method, in accordance with some embodiments of the present disclosure.

It will be noted that the plurality of distortion coefficients K correspond to different positions of the lens 101. As shown in FIG. 6, the image processing method includes following steps 10 and 20 (S10 and S20).

In S10, as shown in FIG. 5, a display region A of the display screen 102 is divided into a plurality of image regions S according to the plurality of distortion coefficients K of the lens 101; an outer boundary line L of each image region S encloses a polygon; a geometric center O2 of the polygon enclosed by the outer boundary line L of the image region S coincides with a geometric center O1 of the lens 101; and distortion coefficients of positions of the lens 101 on which vertexes of the polygon enclosed by the outer boundary line L of the image region S are mapped are the same.

The plurality of distortion coefficients K of the lens 101 are uniformly distributed.

It will be understood that the distortion coefficients of the positions of the lens 101 on which the vertexes of the polygon enclosed by the outer boundary line L of the image region S are mapped are one distortion coefficient K in the plurality of distortion coefficients K.

It will be noted that the embodiments of the present disclosure ignore a situation where the geometric center O1 of the lens 101 is offset from the geometric center O2 of the polygon enclosed by the outer boundary line L of the image region S due to fluctuations in an actual product assembly process.

In S20, anti-distortion processing is performed on coordinates of vertexes of the image region S according to a distortion coefficient corresponding to the vertexes of the image region S, so as to obtain texture coordinates of the vertexes of the image region S.

It will be noted that the vertexes of the image region S described herein are the vertexes of the polygon enclosed by the outer boundary line L of the image region S.

It will be understood that the display region A of the display screen 102 is a region where the display screen 102 is able to normally display images.

It will be noted that the outer boundary line L of the image region S refers to a boundary line of the image region that is away from the geometric center O2 of the image region. The number of sides of the polygon enclosed by the outer boundary line L is greater than or equal to 3.

It will be understood that the distortions coefficients K of the positions of the lens 101 on which the vertexes of the polygon enclosed by the outer boundary line L of each image region S are mapped are equal.

It will be noted that, in the lens 101, a shape of a figure enclosed by a connection line that connects positions with the same distortion coefficient is approximately the same as the shape of the lens 101 (e.g., a circle or an ellipse). Thus, a shape of the polygon enclosed by the outer boundary line L of each image region S is approximately the same as the shape of the lens 101.

In this case, it is possible to avoid a phenomenon that: since shapes of the lens 101 and the image regions S do not match, that is, since distortion coefficients of positions of the lens 101 on which vertexes of the image regions S are mapped differ greatly from the distortion coefficients of the lens 101, in a subsequent process of mapping the image regions, in a transition region between different distortion coefficients of the lens 101, an image has distortion that does not accord with the distortion coefficient of lens 101, and image connection is not smooth, thereby affecting display effect of an image after anti-distortion processing.

In addition, compared with a case where the distortion coefficients of the positions of the lens 101 on which the vertexes of the image regions S' are mapped are located between different distortion coefficients K of the lens 101 in FIG. 3, in embodiments of the present disclosure, since the distortion coefficients K of the positions of the lens 101 on which the vertexes of the polygon enclosed by the outer boundary line L of each image region S are mapped are one distortion coefficient K of the plurality of distortion coefficients K, no vertex exists in the transition region between different distortion coefficients K of the lens 101. Therefore, in the process of performing anti-distortion processing on the coordinates of the vertexes of the image region S according to the distortion coefficient K corresponding to the vertexes of the image region S, the number of vertexes of the plurality of image regions S in the embodiments of the present disclosure is relatively reduced, thereby reducing the amount of computation for performing anti-distortion processing on the vertexes and saving time for image processing.

Furthermore, since the distortion coefficients K of the positions of the lens 101 on which the vertexes of the polygon enclosed by the outer boundary line L of each image region S are mapped are one distortion coefficient K of the plurality of distortion coefficients K, a distortion coefficient K corresponding to the vertexes of each image regions S is known. Therefore, compared with a case where the distortion coefficients of the positions of the lens 101 on which the vertexes of each image region S' are mapped in FIG. 3 may be distortion coefficients except for the plurality of distortion coefficients K, and the distortion coefficients of the positions of the lens 101 on which the vertexes of each image region S' are mapped need to be obtained through computation (e.g., interpolation computation) before performing anti-distortion processing, the embodiments of the present disclosure may reduce the amount of computation for performing anti-distortion processing on the vertexes of the image regions S, shorten the time for image processing, and improve the effect of image processing.

For example, performing anti-distortion processing on the coordinates of the vertexes of the image region S according to the distortion coefficient K corresponding to the vertexes of the image region S, so as to obtain the texture coordinates of the vertexes of the image region S, includes: performing interpolation computation (e.g., a Catmull Rom interpolation computation) on the coordinates of the vertexes according to the distortion coefficient K corresponding to the vertexes of the image region S, so as to obtain the texture coordinates of the vertexes of the image region S.

Therefore, in the image processing method provided in the embodiments of the present disclosure, the display region A of the display screen 102 is divided into the plurality of image regions S, the outer boundary line L of each image region S encloses a polygon, the geometric center O2 of the polygon enclosed by the outer boundary line L of the image region S coincides with the geometric center O1 of the lens 101, and the distortion coefficients K of the positions of the lens 101 on which the vertexes of the polygon enclosed by the outer boundary line L of the image region S are mapped are all the same. In this way, the number of vertexes of the plurality of image regions S may be reduced, the amount of computation for performing anti-distortion processing on the vertexes may be reduced, the time for image processing may be shortened, and the effect of image processing may be improved.

In addition, the shape of the polygon enclosed by the outer boundary line L of each image region S is approximately the same as the shape of the lens 101, and thus it is possible to avoid a phenomenon that: since shapes of the lens 101 and the image region S do not match, in the subsequent process of mapping the image regions S, the image connection is not smooth in the transition region between different distortion coefficients K of the lens 101, thereby affecting the image display effect after anti-distortion processing.

In some embodiments, in a direction from the geometric center O1 of the lens 101 to an edge of the lens 101, the distortion coefficients K of the lens 101 gradually increase.

For two adjacent image regions S, the number of vertexes of an image region S relatively proximate to the geometric center O1 of the lens 101 is less than or equal to the number of vertexes of an image region S relatively away from the geometric center O1 of the lens 101.

It will be understood that, a distortion coefficient K of the lens 101 at the geometric center O1 of the lens 101 is minimum; and a distortion coefficient K of the lens 101 at the edge of the lens 101 is maximum. In the direction from the geometric center O1 of the lens 101 to the edge of the lens 101, a density of figures enclosed by connection lines of positions corresponding to distortion coefficients gradually increases. That is, distortion coefficients K of the lens 101 proximate to the geometric center O1 of the lens 101 are sparsely distributed, and distortion coefficients K of the lens 101 proximate to the edge of the lens 101 are densely distributed.

In this case, in the direction from the geometric center O1 of the lens 101 to the edge of the lens 101, vertexes of image regions S relatively proximate to the geometric center O1 of the lens 101 are sparsely distributed, and vertexes of image regions S relatively proximate to the edge of the lens 101 are densely distributed. Therefore, a distribution mode of the distortion coefficients K of the lens 101 is approximately the same as a distribution mode of the vertexes of the image regions S.

In this way, compared with a case where the vertexes of the image regions S' are uniformly distributed as shown in FIG. 3, distribution of the vertexes of the image regions S in the embodiments of the present disclosure is internally sparse and externally dense, which reduces the number of vertexes, reduces the amount of computation for performing anti-distortion processing on the vertexes, shortens the time for image processing, and improves the effect of image processing.

Figure 7:
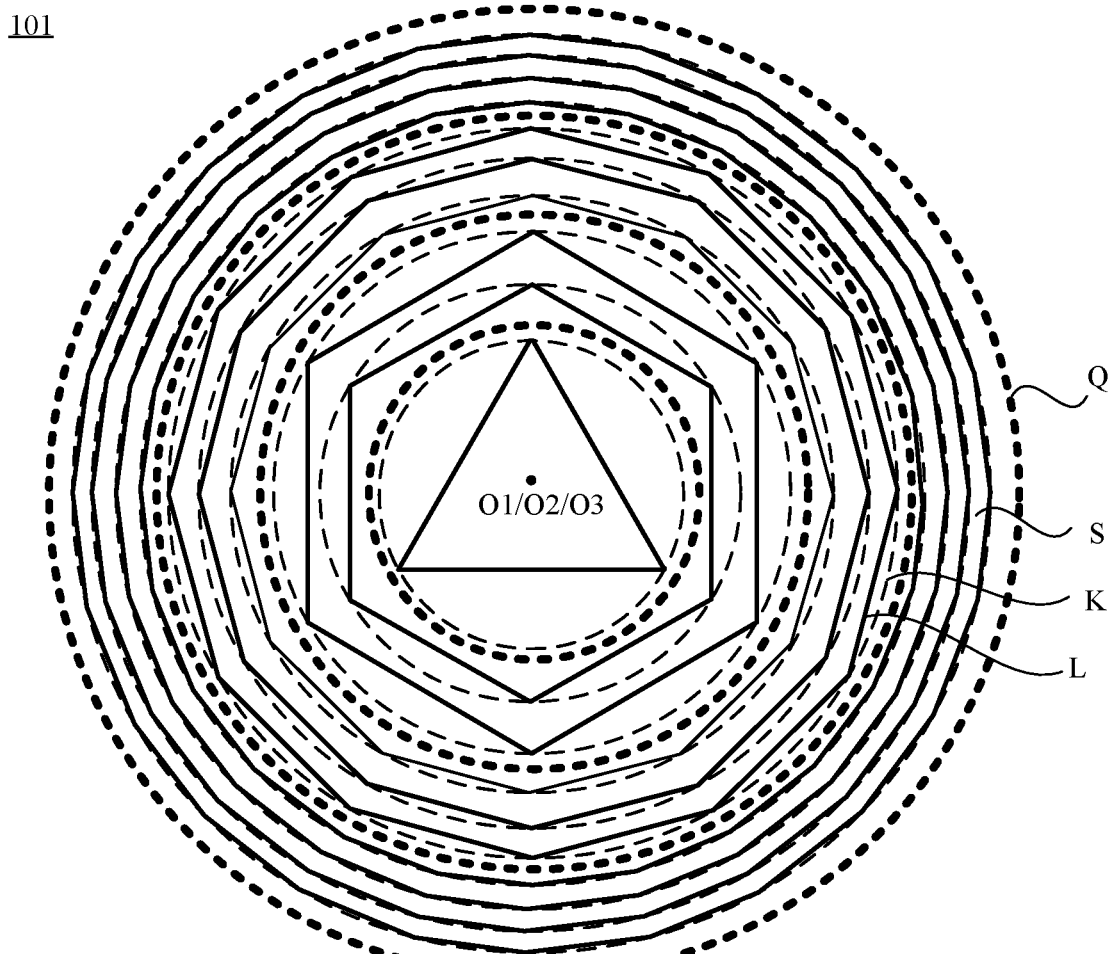
FIG. 7 is a diagram showing another distribution of a plurality of image regions, in accordance with some embodiments of the present disclosure.

In some embodiments, as shown in FIG. 7, the lens 101 includes a plurality of distortion portions Q. Geometric centers O3 of the plurality of distortion portions Q coincide with the geometric center O1 of the lens 101, and each distortion portion Q has at least one distortion coefficient K.

Outer boundary line(s) L of at least one image region S is mapped in the same distortion portion Q.

In the direction from the geometric center O1 of the lens 101 to the edge of the lens 101, the number of vertexes of image regions S mapped in the distortion portions Q sequentially increases.

In a case where outer boundary lines L of multiple image regions S are mapped in the distortion portion Q, the number of vertexes of each image region S mapped in the same distortion portion is equal.

In the case where the outer boundary lines L of the multiple image regions S are mapped in the distortion portion Q, shapes of figures enclosed by outer boundary lines L of image regions S corresponding to the same distortion portion are the same.

In this case, in the direction from the geometric center O1 of the lens 101 to the edge of the lens 101, a density of vertexes of image regions S corresponding to the distortion portions Q gradually increases, and thus the number of vertexes of the plurality of image regions S may be reduced, the amount of computation for performing anti-distortion processing on the vertexes may be reduced, shorten the time for image processing may be shortened, and the effect of image processing may be improved.

In some embodiments, distortion coefficients K corresponding to vertexes of different image regions S are not equal. The number of image regions S into which the display region A of the display screen 102 is divided is equal to the number of distortion coefficients K of the lens 101.

For example, the number of distortion coefficients K of the lens 101 is 10. In the direction from the geometric center of the lens 101 to the edge of the lens 101, the number of vertexes of the plurality of image regions S is 3, 6, 6, 12, 12, 12, 24, 24, 24 and 24, respectively (as shown in FIG. 7); or the number of vertexes of the plurality of image regions S is 3, 6, 6, 12, 12, 24, 24, 48, 48 and 48, respectively (not shown in the figure).

In this case, as shown in FIG. 3, the number of distortion coefficients K is 10, the number of image regions S' distributed in a grid-like manner is 576 (i.e., a product of 24 and 24), and the number of vertexes of the image regions S' is 625 (i.e., a product of 25 and 25). In the embodiments of the present disclosure, as shown in FIG. 7, the number of image regions S is 10, and the number of vertexes of the image regions S is 147 (i.e., a sum of 3, 6, 6, 12, 12, 12, 24, 24, 24 and 24). Therefore, the embodiments of the present disclosure may reduce the number of image regions S and the number of vertexes of the image regions S, thereby reducing the amount of computation for performing anti-distortion processing on the vertexes, shortening the time for image processing, and improving the effect of image processing.

It will be noted that, those skilled in the art is able to set the number of vertexes of the plurality of image regions according to time for image processing and an expected display effect of image in practice and in combination with the distortion coefficients of the lens, which is not limited here.

Figure 8:
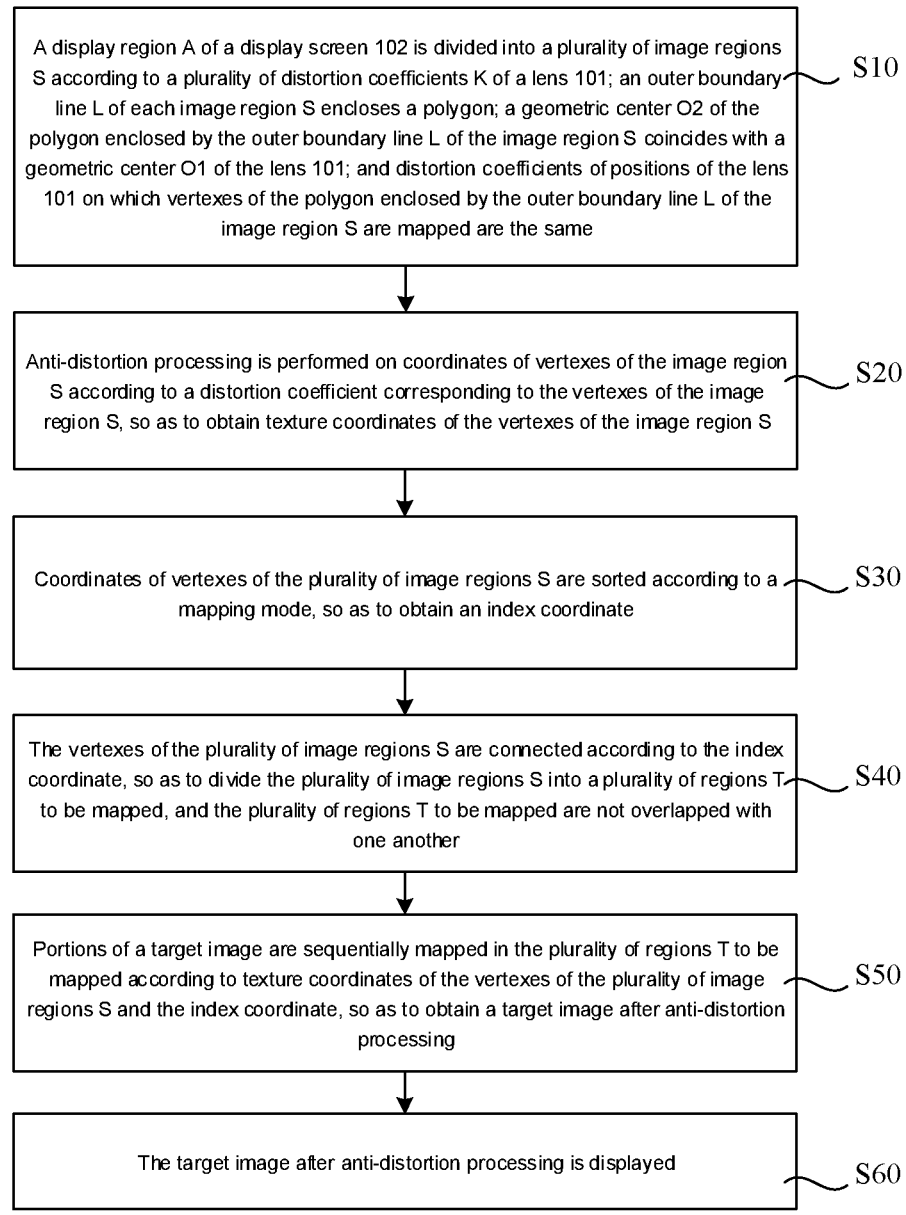
FIG. 8 is a flow diagram of another image processing method, in accordance with some embodiments of the present disclosure.

In some embodiments, as shown in FIG. 8, the image processing method further includes steps 30 to 60 (S30 to S60).

In S30, the coordinates of the vertexes of the plurality of image regions S are sorted according to a mapping mode, so as to obtain an index coordinate.

Figure 9:
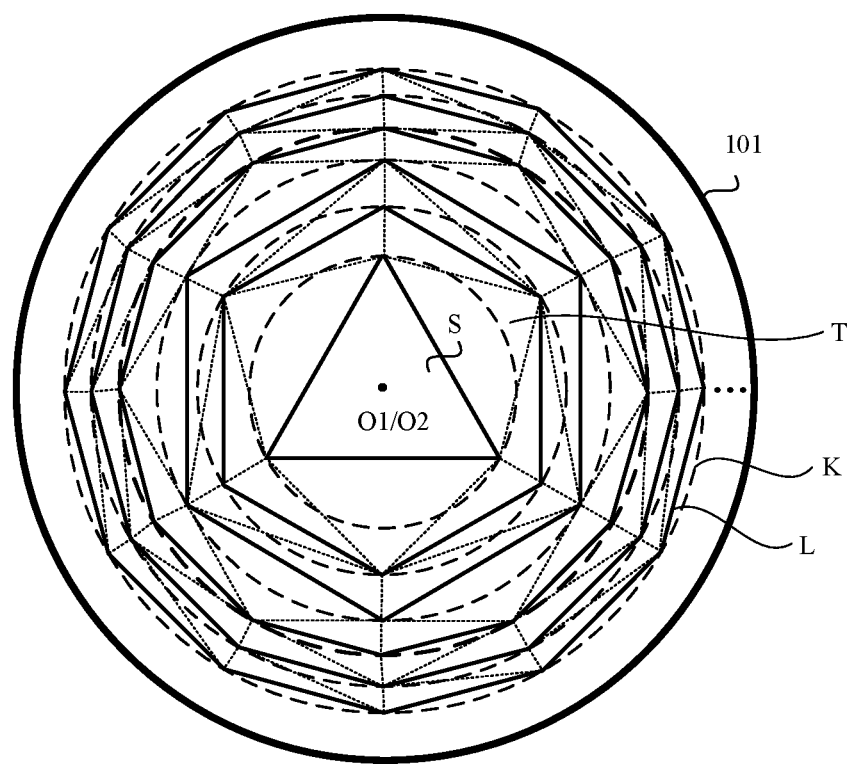
FIG. 9 is a diagram showing yet another distribution of a plurality of image regions, in accordance with some embodiments of the present disclosure.

In S40, as shown in FIG. 9, the vertexes of the plurality of image regions S are connected according to the index coordinate, so as to divide the plurality of image regions S into a plurality of regions T to be mapped; and the plurality of regions T to be mapped are not overlapped with one another.

In S50, portions of the target image are sequentially mapped in the plurality of regions T to be mapped according to texture coordinates of the vertexes of the plurality of image regions S and the index coordinate, so as to obtain a target image after anti-distortion processing.

In S60, the target image after anti-distortion processing is displayed.

In this case, through the lens 101, the target image after anti-distortion processing may be distorted in a direction opposite to a distortion direction of the target image after anti-distortion processing, so that an image displayed on the display screen 102 viewed by the human eye through the lens 101 is a target image that tends to be normal and has no distortion. As a result, a distortion degree of the target image is reduced.

In addition, a shape of the target image after anti-distortion processing obtained by mapping is approximately the shape of the lens 101, which causes an image at a connection position of different distortion coefficients K to be relatively smooth, thereby improving the display effect of the target image after anti-distortion processing.

In some embodiments, the mapping mode is a triangle mapping mode. Connecting the vertexes of the plurality of image regions according to the index coordinate, so as to divide the plurality of image regions S into a plurality of regions T to be mapped, includes step S41.

In S41, as shown in FIG. 9, the vertexes of the plurality of image regions S are connected according to the index coordinate, and each image region is divided into at least one triangle region; each remaining image region S of remaining image regions S other than an image region S closet to the geometric center O1 of the lens 101 is divided into a plurality of triangle regions, the plurality of triangle regions are not overlapped with one another, and the plurality of triangle regions in the remaining image region S have vertexes of the remaining image region S, at least one vertex of vertexes of each triangle region in an image region S is vertex(s) of an image region S that is adjacent to the image region S and closer to the geometric center O1 of the lens 101; areas of the plurality of triangle regions in each remaining image region S are not completely equal; and in the direction from the geometric center O1 of the lens 101 to the edge of the lens 101, the number of triangle regions in image regions S with different numbers of vertexes gradually increases, and areas of the triangle regions in the image regions S with different numbers of vertexes gradually decrease.

For example, as shown in FIG. 9, a shape of the region T to be mapped is a triangle.

In this case, compared with a case where the image region S' is divided into two triangle regions by a diagonal line of the image region S' in FIG. 3, and areas and the number of triangle regions in each image region S' are equal, in the embodiments of the present disclosure, the number of triangle regions may be reduced, thereby shortening the time required for mapping, avoiding the frame drop phenomenon during display due to extension of the time for mapping, and improving the display effect.

It will be noted that, any mapping mode in the art that may realize the image processing method may be adopted in the embodiments of the present disclosure, which is not limited here.

Figure 10:
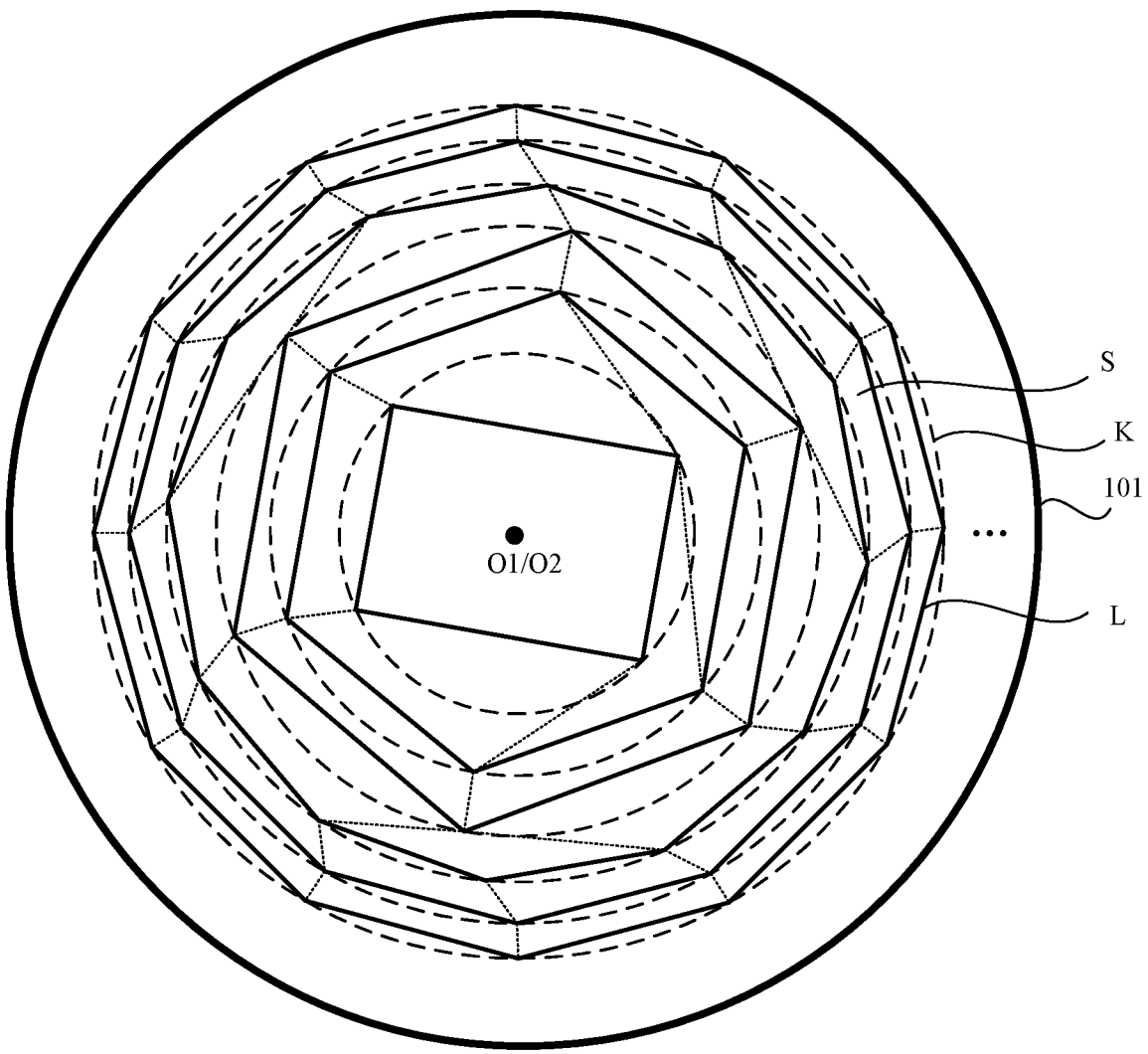
FIG. 10 is a diagram showing yet another distribution of a plurality of image regions, in accordance with some embodiments of the present disclosure.
Figure 11:
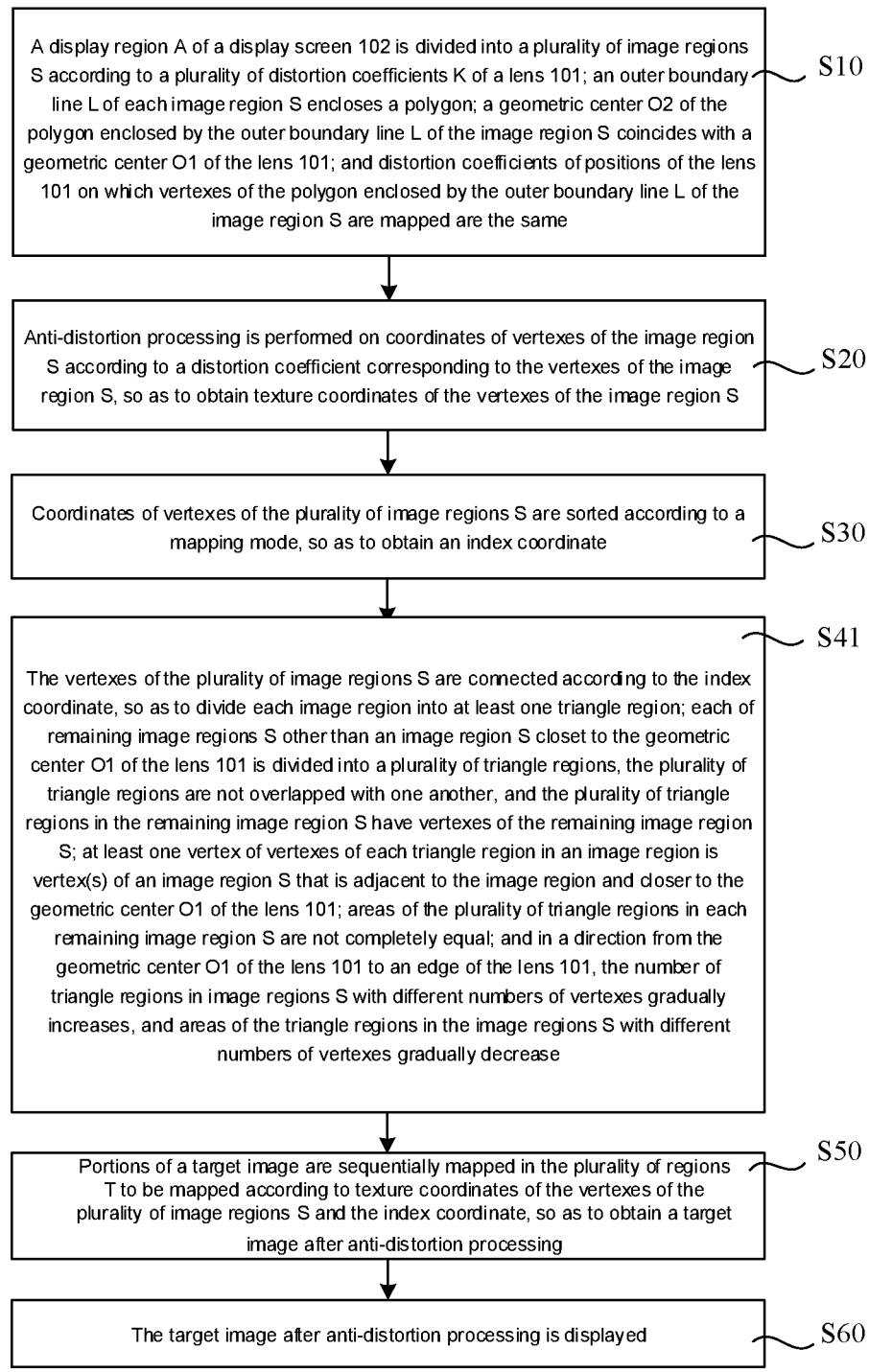
FIG. 11 is a flow diagram of yet another image processing method, in accordance with some embodiments of the present disclosure.

For example, as shown in FIG. 10, the mapping mode may be a quadrilateral mapping mode. In this case, each image region S is divided into at least one quadrilateral region, and each of remaining image regions S other than an image region S closest to the geometric center O1 of the lens 101 is divided into a plurality of quadrilateral regions. At least two vertexes of vertexes of each quadrilateral region in the image region S are vertexes of an image region S that is adjacent to the image region S and closer to the geometric center O1 of the lens 101. Areas of the plurality of quadrilateral regions in each remaining image region S are not completely equal. In the direction from the geometric center O1 of the lens 101 to the edge of the lens 101, the number of quadrilateral regions in the image regions S with different numbers of vertexes gradually increases, and areas of the quadrilateral regions in the image regions S with different numbers of vertexes gradually decrease. In this way, the number of quadrilateral regions is reduced, the time required for mapping is shortened, and the frame drop phenomenon during display due to the extension of the time for mapping is avoided, and the display effect is improved.

Figure 12:
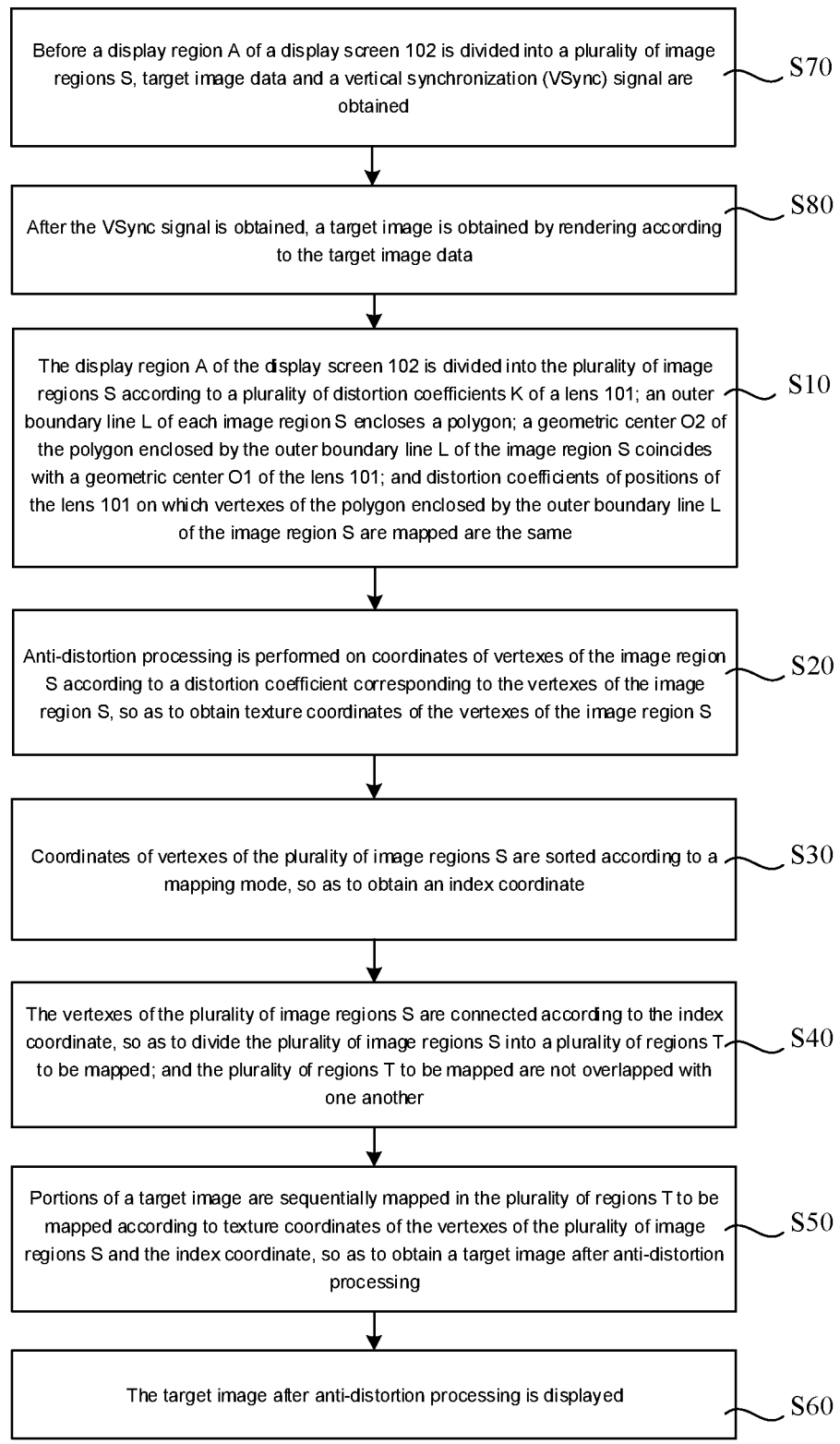
FIG. 12 is a flow diagram of yet another image processing method, in accordance with some embodiments of the present disclosure.

In some embodiments, as shown in FIG. 12, the image processing method further includes steps 70 and 80 (S70 and S80).

In S70, before the display region A of the display screen 102 are divided into the plurality of image regions S, target image data and a vertical synchronization (VSync) signal are obtained.

In S80, after the VSync signal is obtained, the target image is obtained by rendering according to the target image data.

It will be understood that obtaining the target image by rendering is to obtain texture of the target image by rendering.

Moreover, before dividing the display region A of the display screen 102 into the plurality of image regions S, the plurality of distortion coefficients K of the lens 101 are also obtained.

It will be noted that, if the VSync signal is not received, step S80 will not be executed, and step S70 will be performed again to receive the VSync signal.

Figure 13:
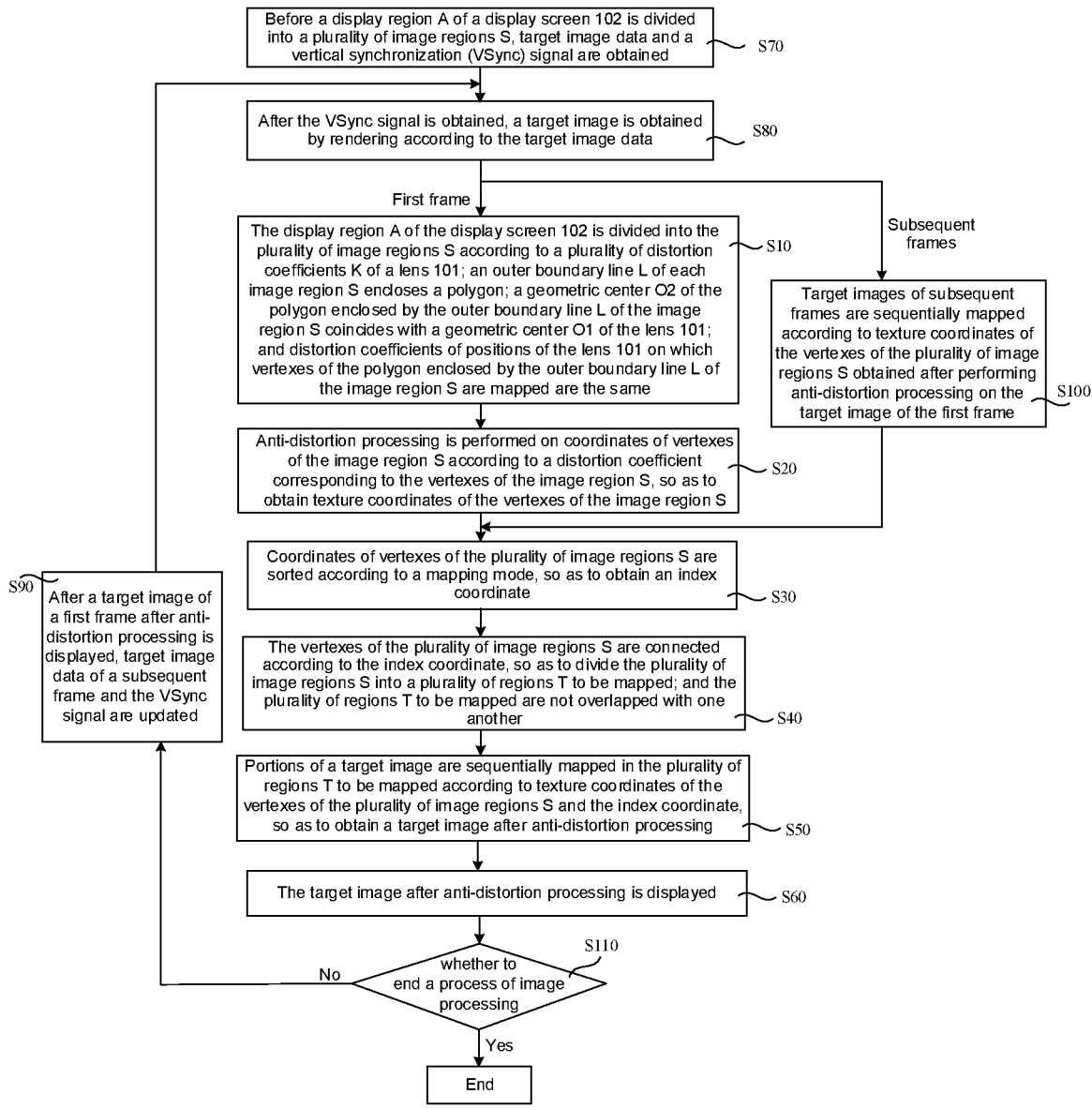
FIG. 13 is a flow diagram of yet another image processing method, in accordance with some embodiments of the present disclosure.

In some embodiments, as shown in FIG. 13, the image processing method further includes steps 90 and 100 (S90 and S100).

In S90, after a target image of a first frame after anti-distortion processing is displayed, target image data of a subsequent frame and the VSync signal are updated.

In S100, target images of subsequent frames is sequentially mapped according to texture coordinates of the vertexes of the plurality of image regions obtained after anti-distortion processing is performed on the target image of the first frame.

In this case, the texture coordinates are obtained by only performing anti-distortion processing on the target image of the first frame, and in a process of displaying the target images of the subsequent frames, the texture coordinates may be directly used without performing anti-distortion computation, which reduces the amount of computation, saves the time for image processing, and improves an efficiency of image processing.

In some embodiments, after displaying a current target image after anti-distortion processing, as shown in FIG. 13, the image processing method further includes step S110.

In S110, whether to end a process of image processing is determined.

If it is determined that the process of image processing is not ended, target image data of subsequent frame(s) and the VSync signal are updated; if it is determined that the process of image processing is ended, the image processing method is finished.

It will be understood that, determining whether to end the process of image processing is to determine whether target image data of a subsequent frame to be updated exists, and if it is determined that no target image data of a subsequent frame to be updated exists, the image processing method is ended.

As shown in FIG. 1, the image display device 100 provided in some embodiments of the present disclosure further includes an image processor 200. The image processor 200 is disposed on the body 110 of the image display device 100 in FIG. 1, and the display screen 102 is coupled to the image processor 200.

The image processor 200 may be a graphics processing unit (GPU).

Referring to FIG. 5, the image processor 200 is configured to: divide the display region A of the display screen 102 into a plurality of image regions S according to a plurality of distortion coefficients K of the lens 101, so that an outer boundary line L of each image region S encloses a polygon, a geometric center O2 of the polygon enclosed by the outer boundary line L of the image region S coincides with a geometric center O1 of the lens 101, and distortion coefficients of positions of the lens 101 on which vertexes of the polygon enclosed by the outer boundary line L of the image region S are mapped are one distortion coefficient of the plurality of distortion coefficients; and perform anti-distortion processing on coordinates of the vertexes of the image region S according to a distortion coefficient corresponding to the vertexes of the image region S to obtain texture coordinates of the vertexes of the image region S.

A rendering capability of a mobile terminal is significantly different from a rendering capability of a personal computer (PC) terminal. For an image processor of an all-in-one image display device, during the anti-distortion processing, when the number of image regions is large, for example, referring to the grid-shaped image regions S' in FIG. 3, when the number of image regions S' reaches a product of 32 and 32 (32×32), mapping time of the image processor is excessively long, resulting in frequent frame drops during display.

In this case, in the image processor 200 provided in the embodiments of the present disclosure, the display region A of the display screen 102 is divided into the plurality of image regions S, the outer boundary line L of each image region S encloses a polygon, the geometric center O2 of the polygon enclosed by the outer boundary line L of the image region S coincides with the geometric center O1 of the lens 101, and the distortion coefficients K of the positions of the lens 101 on which the vertexes of the polygon enclosed by the outer boundary line L of the image region S are mapped are one distortion coefficient of the plurality of distortion coefficients K. In this way, the number of vertexes of the plurality of image regions S may be reduced. Therefore, in a process of performing the anti-distortion processing on the coordinates of the vertexes of the image region S, an amount of computation for performing anti-distortion processing on the vertexes is reduced, time for image processing by the image processor 200 is shortened and performance of the image processor 200 is improved. In a case where the image processor 200 is applied to a mobile terminal image display device, a load of the image processor 200 may be reduced to avoid the frame drop phenomenon.

In addition, the shape of the polygon enclosed by the outer boundary line L of each image region S is approximately the same as the shape of the lens 101, and thus it is possible to avoid a phenomenon that: since shapes of the lens 101 and the image region S do not match, in a subsequent process of mapping the image region S, an image connection is not smooth in a transition region between different distortion coefficients K of the lens 101, thereby affecting display effect of an image after anti-distortion processing.

In some embodiments, referring to FIG. 9, the image processor 200 is further configured to: sort coordinates of vertexes of the plurality of image regions S according to a mapping mode, so as to obtain an index coordinate; connect the vertexes of the plurality of image regions S according to the index coordinate, so as to divide the plurality of image regions S into a plurality of regions T to be mapped that are not overlapped with one another; and map portions of a target image sequentially in the plurality of regions T to be mapped according to texture coordinates of the vertexes of the plurality of image regions S and the index coordinate, so as to obtain a target image after the anti-distortion processing.

In some embodiments, in a case where the mapping mode is a triangle mapping mode, referring to FIG. 9, the image processor 200 is configured to: connect the vertexes of the plurality of image regions S according to the index coordinate, so as to divide each image region S into at least one triangle region, each of remaining image regions S other than an image region closet to the geometric center O1 of the lens 101 being divided into a plurality of triangle regions.

At least one vertex of vertexes of each triangle region in an image region S is vertex(s) of an image region S that is adjacent to the image region S and closer to the geometric center O1 of the lens 101.

Areas of the plurality of triangle regions in each remaining image region S are not completely equal.

In a direction from the geometric center O1 of the lens 101 to an edge of the lens 101, the number of triangle regions in image regions with different numbers of vertexes gradually increases, and areas of the triangle regions in the image regions with different numbers of vertexes gradually decrease.

In some embodiments, the image processor 200 is further configured to: obtain target image data and a VSync signal before the display region of the display screen 102 is divided into the plurality of image regions; and obtain a target image by rendering according to the target image data after the VSync signal is obtained.

It will be understood that the image processor 200 also obtains the plurality of distortion coefficients K of the lens 101 before the display region of the display screen 102 is divided into the plurality of image regions.

In some embodiments, the image processor 200 is further configured to update target image data of a subsequent frame and the VSync signal after a target image of a first frame after anti-distortion processing is displayed.

The image processor 200 is further configured to sequentially map target images of subsequent frames according to the texture coordinates obtained after performing anti-distortion processing on the target image of the first frame.

The image processor 200 has the same beneficial effects as the image processing method, and details will not be repeated here.

It will be noted that, a specific structure of the image processor 200 in the embodiments of the present disclosure may adopt any circuit or module in the art that is capable of achieving corresponding functions, those skilled in the art may make a selection according to situations in practice, and the present disclosure is not limited thereto.

In some embodiments, as shown in FIG. 1, the image display device 100 further includes a controller 103 disposed on the body 110.

The controller 103 is coupled to the image processor 200.

The controller 103 is configured to control the image processor 200 to perform image processing, so that the display screen 102 displays the target image after anti-distortion processing.

It will be understood that the controller 103 transmits the VSync signal to the image processor 200.

It will be noted that, a specific structure of the controller 103 in the image display device 100 provided in the embodiments of the present disclosure may be any circuit or module in the art that is capable of achieving corresponding functions, those skilled in the art may make a selection according to situations in practice, and the present disclosure is not limited thereto.

For example, the controller 103 may be applied to a mobile terminal (e.g., a mobile phone).

Some embodiments of the present disclosure provide a computer-readable storage medium (e.g., a non-transitory computer-readable storage medium). The computer-readable storage medium has stored therein computer program instructions that, when run on a processor, cause the processor to perform one or more steps of the image processing method as described in any of the above embodiments.

For example, the non-transitory computer-readable storage medium includes but is not limited to, a magnetic storage device (e.g., a hard disk, a floppy disk or a magnetic tape), an optical disk (e.g., a compact disk (CD), a digital versatile disk (DVD)), a smart card, a flash memory device (e.g., an erasable programmable read-only memory (EPROM)), a card, a stick or a key driver. Various computer-readable storage media described in the present disclosure may represent one or more devices and/or other machine-readable storage media, which are used for storing information. The term "machine-readable storage media" may include, but are not limited to, wireless channels and various other media capable of storing, containing and/or carrying instructions and/or data.

Some embodiments of the present disclosure further provide a computer program product. The computer program product includes computer program instructions that, when executed on a computer, cause the computer to perform one or more steps of the image processing method as described in the above embodiments.

Some embodiments of the present disclosure further provide a computer program. When the computer program is executed on a computer, the computer program causes the computer to perform one or more steps of the image processing method as described in the above embodiments.

Beneficial effects of the computer-readable storage medium, the computer program product and the computer program are the same as the beneficial effects of the image processing method as described in some of the above embodiments, which will not be repeated here.

The foregoing descriptions are merely specific implementations of the present disclosure. However, the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. An image processing method, the image processing method being applied to an image display device, the image display device including a lens and a display screen, and the lens having a plurality of distortion coefficients;

the image processing method comprising:
dividing a display region of the display screen into a plurality of image regions according to the plurality of distortion coefficients of the lens, wherein an outer boundary line of each image region encloses a polygon, a geometric center of the polygon enclosed by the outer boundary line of the image region coincides with a geometric center of the lens, and distortion coefficients of positions of the lens on which vertexes of the polygon enclosed by the outer boundary line of the image region are mapped are the same; and
performing anti-distortion processing on coordinates of vertexes of the image region according to a distortion coefficient corresponding to the vertexes of the image region, so as to obtain texture coordinates of the vertexes of the image region.

2. The image processing method according to claim 1, wherein in a direction from the geometric center of the lens to an edge of the lens, the plurality of distortion coefficients of the lens gradually increase; and
for two adjacent image regions, a number of vertexes of an image region that is relatively proximate to the geometric center of the lens is less than or equal to a number of vertexes of an image region that is relatively away from the geometric center of the lens.

3. The image processing method according to claim 1, wherein the lens includes a plurality of distortion portions, geometric centers of the plurality of distortion portions coincide with the geometric center of the lens, and each distortion portion has at least one distortion coefficient of the plurality of distortion coefficients;
at least one outer boundary line of at least one image region is mapped in a same distortion portion; and
in a direction from the geometric center of the lens to an edge of the lens, a number of vertexes of image regions mapped in the distortion portions sequentially increases.

4. The image processing method according to claim 3, wherein outer boundary lines of image regions are mapped in a same distortion portion, and a number of vertexes of each image region mapped in the same distortion portion is equal.

5. The image processing method according to claim 1, wherein distortion coefficients corresponding to vertexes of different image regions are not equal; and
 a number of image regions into which the display region of the display screen is divided is equal to a number of the plurality of distortion coefficients of the lens.

6. The image processing method according to claim 1, wherein a number of the plurality of distortion coefficients of the lens is 10; and
 in a direction from the geometric center of the lens to an edge of the lens, a number of vertexes of the plurality of image regions is 3, 6, 6, 12, 12, 12, 24, 24, 24 and 24, respectively; or a number of vertexes of the plurality of image regions is 3, 6, 6, 12, 12, 24, 24, 48, 48 and 48, respectively.

7. The image processing method according to claim 1, further comprising:
 sorting coordinates of vertexes of the plurality of image regions according to a mapping mode, so as to obtain an index coordinate;
 connecting the vertexes of the plurality of image regions according to the index coordinate, so as to divide the plurality of image regions into a plurality of regions to be mapped, the plurality of regions to be mapped being not overlapped with one another;
 mapping portions of a target image sequentially in the plurality of regions to be mapped according to texture coordinates of the vertexes of the plurality of image regions and the index coordinate, so as to obtain a target image after anti-distortion processing; and
 displaying the target image after anti-distortion processing.

8. The image processing method according to claim 7, wherein the mapping mode is a triangle mapping mode;
 connecting the vertexes of the plurality of image regions according to the index coordinate, so as to divide the plurality of image regions into the plurality of regions to be mapped, includes:
 connecting the vertexes of the plurality of image regions according to the index coordinate, so as to divide each image region into at least one triangle region, wherein each remaining image region of remaining image regions other than an image region closet to the geometric center of the lens is divided into a plurality of triangle regions, the plurality of triangle regions are not overlapped with one another, and the plurality of triangle regions in the remaining image region have vertexes of the remaining image region;
 at least one vertex of vertexes of each triangle region in an image region is at least one vertex of an adjacent image region that is closer to the geometric center of the lens;
 areas of the plurality of triangle regions in each remaining image region are not completely equal; and
 in a direction from the geometric center of the lens to an edge of the lens, a number of triangle regions in image regions with different numbers of vertexes gradually increases, and areas of the triangle regions in the image regions with different numbers of vertexes gradually decrease.

9. An image display device, comprising:
 a body;
 a display screen disposed on the body;
 a lens disposed on the body, wherein the lens is closer to a human eye than the display screen when the image display device is worn, and the lens has a plurality of distortion coefficients; and
 an image processor disposed on the body, wherein the image processor is coupled to the display screen, and the image processor is configured to: divide a display region of the display screen into a plurality of image regions according to the plurality of distortion coefficients of the lens, so that an outer boundary line of each image region encloses a polygon, a geometric center of the polygon enclosed by the outer boundary line of the image region coincides with a geometric center of the lens, and distortion coefficients of positions of the lens on which vertexes of the polygon enclosed by the outer boundary line of the image region are mapped are the same; and perform anti-distortion processing on coordinates of vertexes of the image region according to a distortion coefficient corresponding to the vertexes of the image region, so as to obtain texture coordinates of the vertexes of the image region.

10. The image display device according to claim 9, wherein the image processor is further configured to: sort coordinates of vertexes of the plurality of image regions according to a mapping mode, so as to obtain an index coordinate; connect the vertexes of the plurality of image regions according to the index coordinate, so as to divide the plurality of image regions into a plurality of regions to be mapped that are not overlapped with one another; and map portions of a target image sequentially in the plurality of regions to be mapped according to texture coordinates of the vertexes of the plurality of image regions and the index coordinate, so as to obtain a target image after anti-distortion processing.

11. The image display device according to claim 10, wherein the mapping mode is a triangle mapping mode; and
 the image processor is configured to: connect the vertexes of the plurality of image regions according to the index coordinate, so as to divide each image region into at least one triangle region, wherein
 each remaining image region of remaining image regions other than an image region closet to the geometric center of the lens is divided into a plurality of triangle regions, the plurality of triangle regions are not overlapped with one another, and the plurality of triangle regions in the remaining image region have vertexes of the image remaining region;
 at least one vertex of vertexes of each triangle region in an image region is at least one vertex of an adjacent image region that is closer to the geometric center of the lens;
 areas of the plurality of triangle regions in each remaining image region are not completely equal; and
 in a direction from the geometric center of the lens to an edge of the lens, a number of triangle regions in image regions with different numbers of vertexes gradually increases, and areas of the triangle regions in the image regions with different numbers of vertexes gradually decrease.

12. The image display device according to claim 9, further comprising:
 a controller disposed on the body, the controller being coupled to the image processor.

13. A non-transitory computer-readable storage medium, the non-transitory computer-readable storage medium storing computer program instructions that, when run on a processor, cause the processor to perform one or more steps of the image processing method according to claim 1.

14. The image processing method according to claim 2, wherein the lens includes a plurality of distortion portions, geometric centers of the plurality of distortion portions coincide with the geometric center of the lens, and each distortion portion has at least one distortion coefficient of the plurality of distortion coefficients;

at least one outer boundary line of at least one image region is mapped in a same distortion portion; and in a direction from the geometric center of the lens to an edge of the lens, a number of vertexes of image regions mapped in the distortion portions sequentially increases.

15. The image processing method according to claim 7, wherein the mapping mode is a quadrilateral mapping mode; and connecting the vertexes of the plurality of image regions according to the index coordinate, so as to divide the plurality of image regions into the plurality of regions to be mapped, includes:

connecting the vertexes of the plurality of image regions according to the index coordinate, so as to divide each image region into at least one quadrilateral region, wherein each remaining image region of remaining image regions other than an image region closet to the geometric center of the lens is divided into a plurality of quadrilateral regions, at least two vertexes of vertexes of each quadrilateral region in an image region are vertexes of an adjacent image region that is closer to the geometric center of the lens;

areas of the plurality of quadrilateral regions in each remaining image region are not completely equal; and in a direction from the geometric center of the lens to an edge of the lens, a number of quadrilateral regions in image regions with different numbers of vertexes gradually increases, and areas of the quadrilateral regions in the image regions with different numbers of vertexes gradually decrease.

16. The image processing method according to claim 1, further comprising:

obtaining target image data and a vertical synchronization signal before the display region of the display screen is divided into the plurality of image regions; and obtaining a target image by rendering according to the target image data after the vertical synchronization signal is obtained.

17. The image processing method according to claim 16, further comprising updating target image data of a subsequent frame and the vertical synchronization signal after a target image of a first frame after anti-distortion processing is displayed.

18. The image processing method according to claim 17, further comprising mapping target images of subsequent frames sequentially according to texture coordinates of vertexes of the plurality of the image regions obtained after anti-distortion processing is performed on the target image of the first frame.

\* \* \* \* \*